United States Patent [19]  [11] 4,316,832
Walkden  [45] Feb. 23, 1982

[54] PLASTICIZER COMPOSITIONS FOR USE WITH SYNTHETIC RESIN POLYMERS

[75] Inventor: David J. Walkden, Salford, England

[73] Assignee: Diamond Shamrock Industrial Chemicals Limited, Manchester, England

[21] Appl. No.: 884,856

[22] Filed: Mar. 9, 1978

[30] Foreign Application Priority Data

Mar. 10, 1977 [GB] United Kingdom ............... 10121/77

[51] Int. Cl.$^3$ ................................................ C08K 5/12
[52] U.S. Cl. ............................ 260/31.8 N; 260/31.8 M
[58] Field of Search ....................... 260/31.8 R, 31.8 N, 260/859 PV, 75 NK, 31.8 M

[56] References Cited

U.S. PATENT DOCUMENTS

| 3,444,266 | 5/1969 | Reischl | 260/31.8 N |
| 3,494,896 | 2/1970 | Aoki | 260/31.8 N |
| 3,632,533 | 1/1972 | Winkler | 260/859 PV |
| 3,637,553 | 1/1972 | Keberle | 260/859 PV |
| 3,763,079 | 10/1973 | Fryd | 260/75 NK |
| 3,879,330 | 4/1975 | Lustig | 260/859 PV |

Primary Examiner—Paul R. Michl
Attorney, Agent, or Firm—Bacon & Thomas

[57] ABSTRACT

A plasticizer composition for synthetic resins, particularly polyvinyl chloride consisting essentially of (a) the phthalate ester of an aliphatic alcohol containing from 5 to 12 carbon atoms in the aliphatic moiety, e.g. diheptanyl or dialphanyl phthalate, and, intimately mixed therewith, a polyurethane resin which is the reaction product of a di-isocyanate and a polyester based in part on terephthalic acid, e.g. an hydroxy terminated polyester containing terephthalic acid, adipic acid, and hexane diol residues, which is particularly suitable for producing plasticized resins with low electrical conductivity.

15 Claims, No Drawings

PLASTICIZER COMPOSITIONS FOR USE WITH SYNTHETIC RESIN POLYMERS

FIELD OF THE INVENTION

This invention relates to plasticiser compositions for use with synthetic resin polymers, and concerns in particular such plasticiser compositions which contain a polyurethane as a component thereof.

DESCRIPTION OF PRIOR ART

It is well-known that some synthetic resin polymers are, in a "pure" state, too brittle to be usable for certain purposes, but that this can be dealt with by intimately mixing into the synthetic resin a material which "plasticises" the resin, thereby effectively reducing the latter's brittleness, and thus increasing its flexibility. One such resin often requiring the incorporation of a plasticiser before it is of use is polyvinyl chloride (p.v.c.), and plasticisers which have in the past been employed with p.v.c. are, for example, dialphanyl phthalate, dioctyl phthalate and trixylyl phosphate.

Unfortunately, it is the case that many plasticisers or plasticiser compositions, otherwise quite suitable for use with the resin involved, can diffuse through the resin with relative ease even when physically compatible therewith, and this diffusion is manifested in a tendency for the plasticiser (or plasticiser composition) mixture to exude from, and sometimes appear as an oily film on the surface of, the resin. This naturally results in a reduction of the desirable physical qualities of the resin.

SUMMARY OF THE INVENTION

We have now found that a novel form of plasticiser composition, incorporating a polyurethane as a component thereof, does not suffer-or, at the very least, does not suffer so seriously—from the disadvantages discussed above in connection with the plasticisers (or plasticiser compositions) previously mentioned. In addition, this novel form of plasticiser composition appears to confer upon the synthetic resin with which it is to be mixed a further advantage, namely a significant increase in the electrical resistivity of the mixture. This should be of value in applications where the resin is required to have good insulating properties.

In one aspect, therefore, this invention provides a composition suitable for use as a plasticiser, which composition consists essentially of:
  (a) the phthalate ester of an aliphatic alcohol containing from 5 to 12 carbon atoms in the aliphatic moiety;
and, intimately mixed therewith,
  (b) a polyurethane resin which is the reaction product of a di-isocyanate and a polyester based in part upon terephthalic acid.

DETAILED DESCRIPTION OF THE INVENTION

The phthalate ester—the plasticising component of the compositions of the invention—is preferably an ester of a $C_6$ to $C_{10}$ aliphatic alcohol, especially of a $C_7$ to $C_9$ alcohol. Typical such $C_6$ to $C_{10}$ alcohols are hexanol, heptanol, iso-octanol, nonanol and iso-decanol, especially heptanol. Mixtures of the appropriate alcohols can also be employed, giving a mixture of phthalate esters, and in fact such ester mixtures, for example that known as dialphanyl phthalate (based on a commercial mixture of $C_7$ to $C_9$ alcohols, containing approximately 45 wt % $C_7$, 43 wt % $C_8$ and 12 wt % $C_9$), are particularly preferred for economic reasons.

The di-isocyanate from which the polyurethane component is formed may be any of those di-isocyanates commonly employed or suggested for the formation of polyurethanes. Typically, therefore, it can be MDI (methylene diphenyl isocyanate, or di-isocyanato diphenyl methane), hydrogenated MDI (di-isocyanato dicyclohexyl methane) or TDI (toluene di-isocyanate), or any of the commercial varieties of these. MDI is, in fact, preferred.

Though the polyurethane resin component may be prepared separately, and then mixed with the plasticiser component, this may give rise to difficulties. It is very much preferred, therefore, that the polyurethane component should actually be formed in the presence of the plasticiser component. The resultant mixture is, as it were, pre-mixed—and it apparently takes the form of a three-dimensional polyurethane network having the plasticiser component trapped therewithin.

The polyester from which the polyurethane component is formed is conveniently one derived from a diol and a mixture of two dibasic acids one of which is terephthalic acid, the polyester itself having a molecular weight of from 1,500 to 2,500, especially about 2,000. By far the most useful diol is hexane diol (though compatible, but liquid, plasticiser compositions have been made using a polyurethane component based on neopentyl diol). The dibasic acid which is not terephthalic acid may be sebacic acid, but is preferably adipic acid. Suitable molar proportions for the two acids—terephthalic acid and the other acid—are from 10 to 14 terephthalic acid to from 3 to 6 other acid (especially when the latter is adipic acid). Decreasing the amount of terephthalic acid leads to an increasing tendency for the two plasticiser composition components to be physically incompatible, and for the softening point of the mixture to be too low, while increasing the amount of terephthalic acid may result in the mixture's softening point being too high (so that it will not easily blend with the synthetic resin to be plasticised). The preferred amounts of the two acids thus tend to depend somewhat on such factors as ease of granulation, and softening points, but those skilled in the art will be able to determine, in any particular case, how much terephthalic acid must be used to achieve the desired properties. It is important to note that the use of too little terephthalic acid in the polyester, or the use of a polyester with too low a molecular weight, may lead to the plasticiser composition being a wet solid; such wet solids are not pleasant to handle, and lack good storage life (the two components gradually separate).

The actual amount of polyester formed into the polyurethane component (thus, the relative amounts of polyester and di-isocyanate) may vary in such a way that the NCO index (100 times the ratio of isocyanate equivalent to polyester equivalent) of the polyurethane product is in the range 60 to 100. Preferred amounts are such as to give a polyurethane product with an NCO index of from 80 to 100.

The plasticiser compositions of the invention may contain the two components (phthalate ester and polyurethane) in a fairly wide range of proportions, though the use of too much phthalate ester may result in a lack of homogeneity in the composition. A typical preferred range of weight ratios is from 2 to 1 to 0.5 to 1 phthalate:polyurethane, though in general the range from 1.5 to 1 to 0.75 to 1 is preferred, with the most preferred ratio being substantially 1:1.

The preferred plasticiser compositions of the invention are generally homogeneous solids each having a softening point between 60° and 120° C., the particularly preferred compositions each having a softening point between 70° and 110° C. These particularly preferred compostions are dry solids, and can conveniently be stored in the form of granules or pellets without the addition of a coating agent to prevent agglomeration or caking. The compositions may be used on their own—as the sole "plasticiser" for the synthetic resin to be plasticised—or in combination with another plasticiser compatible with the compositions. Indeed, in order to obtain the most sought-after properties in the resin being plasticised (thus, softness values) the use of additional plasticiser may be necessary. The additional plasticiser may be of the same type as that on which the plasticiser composition is based, or it may be of a different type of plasticiser altogether. Typical such additional plasticisers usable with the compositions of the invention are dialphanyl phthalate, di-octyl phthalate, trixylyl phosphate and butyl benzyl phthalate.

The plasticiser compositions of the invention may simply be prepared by intimately mixing the two components. Very desirably, however, they are prepared by forming the polyurethane component in the presence of the phthalate ester component (as mentioned above). Thus, in another aspect, this invention provides a method of forming a plasticiser composition of the invention, which method comprises reacting the terephthalic acid-based polyester with the di-isocyanate to form the polyurethane, the reaction being effected in the presence of the $C_5$ to $C_{12}$ alcohol phthalate ester.

It will be noted that for convenience the terephthalic acid used to form the polyester may be added in the form of an ester thereof—for example, as dimethyl terephthalate. The reaction may be effected in the presence of a suitable catalyst, such as a fatty acid metal salt like lead octoate (preferably), stannous octoate, or dibutyl tin dilaurate.

The invention extends, of course, to a plasticiser composition whenever prepared by a process as described and defined herein.

The plasticiser compositions of the invention appear useful as "plasticisers" for a whole variety of synthetic resin compositions—for example, the compositions may be of use with such synthetic resins as polypropylene, poly(acrylonitrile butadiene styrene), polyvinyl acetate, and polyethylene vinyl acetate. However, their main use is envisaged as plasticisers for polyvinyl chloride.

Accordingly, in a further aspect this invention provides a method of plasticising a synthetic resin polymer, which method comprises mixing, heating and blending the synthetic resin with a plasticiser composition of the invention.

The synthetic resin is preferably polyvinyl chloride.

The plasticising process is most easily carried out using a dry plasticiser composition of the invention. The solid is granulated and mixed with, for example, polyvinyl chloride powder (and any other desired ingredients, such as other plasticisers and stabilisers), and the mixture is then heated and, if desired, subjected to pressure and/or further mechanical mixing.

"Wet" plasticiser compositions of the invention may be used soon after their preparation, but cannot easily be stored for long periods; they are in general not as convenient as the dry compositions.

If conventional liquid plasticisers are to be used in conjunction with a plasticiser composition of the invention, they are conveniently added after the dry blending of the resin and the plasticiser composition.

The present invention naturally extends to articles of synthetic resin, particularly of polyvinyl chloride, plasticised with a composition of the invention.

The polyurethane components of the plasticiser composition of the invention, especially those polyurethane components prepared in the presence of the plasticiser component, are believed to be novel materials. Accordingly this invention in addition provides those polyurethane components per se, together with the processes described herein for their preparation and the polyurethanes when thus prepared.

The following Examples and Test Data are now given, though only by way of illustration, to show details of various aspects of the invention.

EXAMPLE 1

An Inventive Plasticiser Composition

A composition containing a polyester polyurethane and a phthalate ester was made by the following method.

(A) The terephthalic/adipic/hexanediol polyester 666 g adipic acid (4.56 moles) were reacted with 2240 g hexane-1,6-diol (19 moles) at 220° C. under vacuum until the acid value was not greater than 1. The reaction mixture was then cooled to 120° C., and 0.075 g isopropyltitanate (15 ppm approx) was added as catalyst. 2334 g dimethylterephthalate (12 moles) were added, and most of the methanol liberated was removed by distillation at temperatures up to 150° C. at atmospheric pressure. The mixture was equilibrated at 220° C., and the pressure was reduced to 50 mm/Hg to remove any traces of remaining methanol. The resulting polyester was a hard, white solid with a melting point of 110° to 117° C. It had a molecular weight of 2,000, and the molar proportion of terephthalate to adipate was 2.63.

(B) The phthalate ester/polyurethane mixture 26.3 g (0.105 mole) of MDI were melted into a reaction flask, and 238 g dialphanyl phthalate (DAP—derived from a commercial mixture of $C_7$ to $C_9$ alcohols) were added, causing crystallisation of the isocyanate. The mixture was then heated to 60° C., with stirring under nitrogen, until it became homogeneous.

211.7 g of polyester (0.1 mole) were separately heated to about 140° C., and added to the isocyanate mixture (the polyester and isocyanate charges were in the molar ratio of 1:1.05). After the addition, the mixture was at a temperature of 90° to 100° C., and further heat was applied to increase the temperature to from 120° to 130° C., reducing the viscosity of the mixture and permitting efficient stirring. 0.1% by weight of a lead octoate catalyst (50% in white spirit) was then added, and after the reaction had proceeded for about 30 minutes a sample was removed and the % -NCO determined. A polyester recharge (20 g) was added to bring the -NCO index to 100, and the -NCO determination was repeated after a further 30 minutes. Prior to the polyester recharge more DAP (20 g) was added to bring the weight ratio of DAP to polyurethane to 1:1.

When the free -NCO content was not greater than 0.1% the reaction mixture was poured out and allowed to cool. The formed material, the plasticiser composition, was a dry solid with good acceptability. It was easily granulated to give a particulate material with a dry handle.

EXAMPLE 2

Inventive and Comparative Plasticiser Compositions

The process of Example 1, B was repeated, but using different polyesters. A terephthalic/adipic/hexane diol polyester of molecular weight 1,000 gave a wet solid plasticiser composition, which though unpleasant to use was nevertheless of fair acceptability.

However, the use of various non-terephthalic polyesters—for example, adipic/butane diol polyesters of various molecular weights, adipic/hexane diol, adipic/diethylene glycol, adipic/monoethylene glycol/butane diol, o-phthalic/adipic/hexane diol, o-phthalic/adipic/monoethylene glycol, and adipic/neopentyl glycol/hexane diol, gave products which immediately separated into distinct liquid and solid phases, and which were of little value as plasticiser compositions.

EXAMPLE 3

The use of various Inventive or Comparative Plasticiser Compositions

Extraction Tests:

Two types of typical P.V.C. formulations were chosen for testing the plasticiser compositions of the invention. One was a calendered sheet formulation (I) while the other was a simple footwear (shoe sole) formulation (II); the ingredients are shown in Table I below.

TABLE I

| | | Parts by Weight | |
|---|---|---|---|
| Ingredient | | I | II |
| P.V.C.: | BREON S125/12 | 100 | — |
| | CORVIC D65/02 | — | 100 |
| Stabiliser: | MARK 189E | 2 | — |
| | MARK LP15 | — | 2 |
| Lubricant: | Stearic Acid | 0.5 | — |
| Filler: | Whiting | 20 | — |
| Plasticiser System: | | 80 | 80 |

NOTES:
(1) BREON S125/12 is a British Petroleum Limited vinyl chloride homopolymer prepared by a suspension process and characterised in that the specific viscosity of a 0.5% solution in cyclohexane lies within the range 0.62–0.66.
(2) CORVIC D65/02 is an Imperial Chemicals Industries' P.V.C. homopolymer made by a suspension polymerisation process and characterised in that a solution of 0.5g of polymer in 100 ml ethylene chloride has a K value of 65 as determined from the relative viscosity measured at 25°C.
(3) MARK 189E is a liquid stabiliser based upon a barium cadmium organic complex.
(4) MARK LP15 is a solid stabiliser based upon a barium cadmium organic complex.

In each case three plasticiser systems were tested, being:
(a) DAP by itself;
(b) a 1:1 mixture of DAP and DIOLPATE 171 (a commercial polymeric polyester-based plasticiser obtainable from Briggs & Townsend); and
(c) the inventive plasticiser composition of Example 1.

Firstly, the P.V.C. powder, the plasticiser system under test, and the various other ingredients (stabiliser, lubricator and/or filler) were hand-mixed together. This mixture was then rolled into sheets (in each case it was worked on a two roll mill, front roll at 165° C. and the back roll at 155° C., until a band of material was evident on the front roll; this was sheeted off and pressed into 10 thousandth of an inch thick sheets using a pressure of $\frac{1}{4}$ ton per square inch at 140° C. for 3 minutes then $\frac{1}{2}$ ton per square inch at 140° C. for 2 minutes followed by 1 ton per square inch whilst cooling down), and $1 \times \frac{1}{2}$ inch squares were cut therefrom for testing.

The tests were designed to show how easily the constituents of the P.V.C. formulation could be extracted with mineral oil or petrol (the less that could be extracted, the better the formulation), and Table II below shows the results (as a percentage weight loss of the test sample following 7 days immersion at 23° C.) for a number of tests averaged together.

TABLE II

| Formulation | Plasticiser System | % Weight Loss (Oil Extraction) | % Weight Loss (Petrol Extraction) |
|---|---|---|---|
| I | DAP | 2.76 | 36.34 |
| I | 1:1 DAP:DIOLPATE 171 | 1.58 | 16.99 |
| I | Example I Inventive composition | 0.35 | 4.39 |
| II | DAP | 1.86 | 36.82 |
| II | 1:1 DAP:DIOLPATE 171 | 1.09 | 16.01 |
| II | Example I Inventive composition | 0.04 | 5.00 |

These results clearly show the superiority, in these tests, of the plasticiser composition of Example I.

Electrical Resistance Tests

In a manner similar to that described immediately above, there was prepared a series of plasticised P.V.C. formulations using Corvic D65/02 P.V.C. These were then tested for electrical resistance (as volume resistivity, using BS 278 part 2) and Shore A hardness (using ASTM D 2240). The formulations—and the results—are shown in Table III below.

TABLE III

| Component | Amounts (parts by weight) | | | |
|---|---|---|---|---|
| | 1 | 2 | 3 | 4 |
| PVC (CORVIC D65/02) | 100 | 100 | 100 | 100 |
| DAP (additional plasticiser) | 80 | 40 | 40 | — |
| LANKROTHANE 4067 | — | 40 | — | — |
| Example 1 Inventive composition | — | — | 40 | 80 |
| Volume resistivity | $6 \times 10^{11}$ | $2 \times 10^{12}$ | $4 \times 10^{13}$ | $5 \times 10^{14}$ |
| Shore A hardness | 85 | 95 | 88 | 95 |

LANKROTHANE 4067 is a commercial polyester-based polyurethane used in the formation of plasticiser systems.

For these Tests to be of value, it is necessary to compare formulations of similar Shore A hardness. The results clearly show the superiority, in these tests, of the Example 1 inventive plasticiser composition. However, it should here be emphasised that the Test Compositions are not, in this case, compositions as might actually be used in, say, formulations for use as electrical cable insulation, but have been specially formulated purely for the Test itself.

EXAMPLE 4

Further use of various Inventive or Comparative Plasticiser Compositions

In a similar manner to that described in Example 3, the following ingredients (Table IV below) were blended to give a P.V.C. formulation, rolled into sheet form, and tested against vegetable (olive)oil extraction (24 hours at 50° C.).

TABLE IV

| Ingredient | | Parts by Weight |
|---|---|---|
| P.V.C. | BREON 110/10 | 100 |
| Stabiliser (I): | MARK WS | 1.0 |
| Stabiliser (II): | MARK C | 0.75 |
| Extender plasticiser: | LANKROFLEX ED6 | 4.5 |
| Plasticiser system (see Table V below) | | 90 |

The plasticiser systems tested, and the results, are shown in Table V below.

TABLE V

| Plasticiser | % Weight Loss (Oil Extraction) |
|---|---|
| DAP | 31.5 |
| 2:1 DAP:ULTRAMOL PU | 14.2 |
| 2:1 DAP:LANKROTHANE 4078 | 11.9 |
| 2:1 DAP:Example 1 Inventive composition | 8.5 |

NOTES:
(1) BREON 110/10 is a British Petroleum Limited P.V.C. homopolymer prepared via a dispersion process. It is characterised in that the specific viscosity of a 0.5% solution of the polymer in cyclohexane lies within the range of 0.53–0.58.
(2) MARK WS is a mixed barium/cadmium stabiliser.
(3) MARK C is an alkylaryl phosphite.
(4) LANKROFLEX ED6 is an epoxidised ester of tall oil fatty acid.
(5) ULTRAMOL PU (Bayer) LANKROTHANE 4078 (Lankro Chemicals) are commercial polyurethanes used in the formation of plasticiser systems. They are both based on polyester polyurethanes.

With regard to the formulations referred to in Table IV it is emphasised that the pressed sheets of plasticised P.V.C. containing the commercial thermoplastic polyurethanes each showed evidence of discrete unplasticised particles of polyurethane (commonly referred to as fish-eyes). No such lack of homogeneity was apparent in the pressed sheets containing the inventive plasticiser.

I claim:

1. A solid, essentially homogeneous plasticiser composition which consists essentially of:

(a) the phthalate ester of an aliphatic alcohol containing from 5 to 12 carbon atoms in the aliphatic moiety; and, intimately mixed therewith, (b) an hydroxy terminated polyurethane resin having an NCO index of from 60 to 100 which is the reaction product of a di-isocyanate and a polyester based upon two dicarboxylic acids, one of which is terephthalic acid, and a diol.

2. A plasticiser composition as claimed in claim 1, wherein the phthalate ester is an ester of a $C_7$ to $C_9$ alcohol.

3. A plasticiser composition as claimed in claim 2, wherein the phthalate ester is an ester of heptanol.

4. A plasticiser composition as claimed in claim 1 wherein the said di-isocyanate is methylene diphenyl isocyanate (M.D.I.).

5. A plasticiser composition as claimed in claim 1, wherein the said polyester has a molecular weight of from 1,500 to 2,500.

6. A plasticiser composition as claimed in claim 5, wherein the diol is hexane diol.

7. A plasticiser composition as claimed in claim 5 wherein the second dicarboxylic acid is adipic acid.

8. A plasticiser composition as claimed in claim 5 wherein the molar proportion of the terephthalic acid and the second acid in the polyester is from 10 to 14 moles of terephthalic acid to from 3 to 6 moles of the second acid.

9. A plasticiser composition as claimed in claim 1 wherein the polyurethane resin has an NCO index (100 times the ratio of isocyanate equivalent to polyester equivalent) in the range 80 to 100.

10. A plasticiser composition as claimed in claim 1 containing the phthalate ester and polyurethane resin in the range of weight ratios of from 1.5 to 1 to 0.75 to 1 phthalate: polyurethane.

11. A plasticiser composition as claimed in claim 10 wherein the said ratio is substantially 1:1.

12. A method of forming a plasticiser composition as claimed in claim 1 in which the terephthalate acid-based polyester is reacted with the di-isocyanate to form the polyurethane resin in the presence of the $C_5$ to $C_{12}$ alcohol phthalate ester, wherein the reaction is conducted in the presence of lead octoate as a catalyst.

13. A polyvinyl chloride plasticised with up to 100 parts by weight of a composition as claimed in claim 1 per 100 parts of polyvinyl chloride.

14. An article prepared from polyvinyl chloride plasticised with a composition as claimed in claim 1.

15. A plasticiser composition as claimed in claim 1 wherein the polyurethane resin has been formed in the presence of the phthalate ester.

* * * * *